UNITED STATES PATENT OFFICE 2,435,813

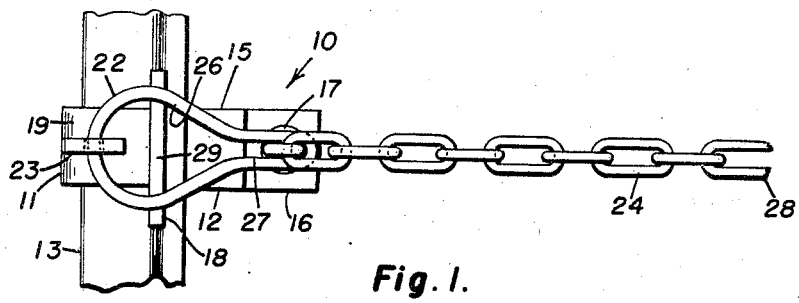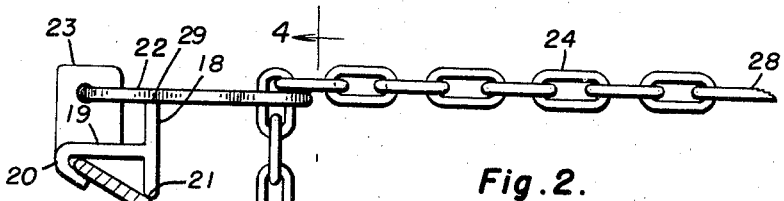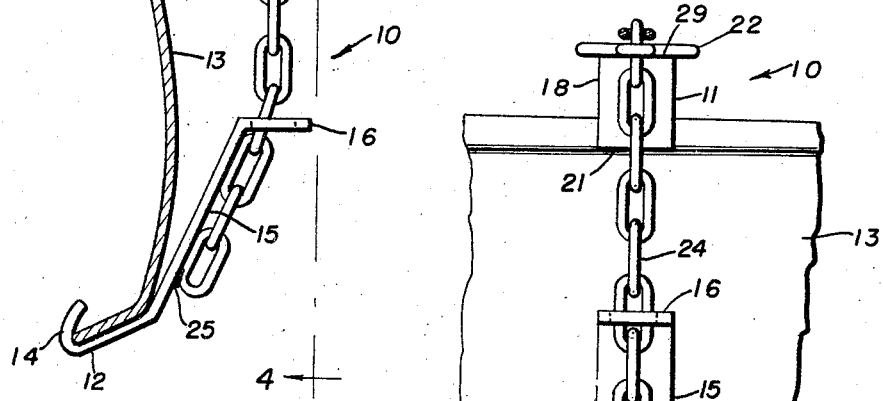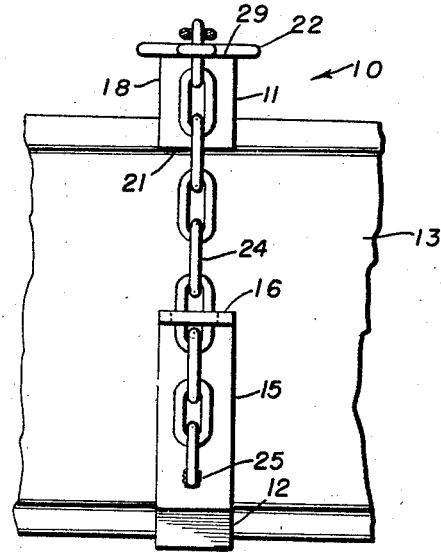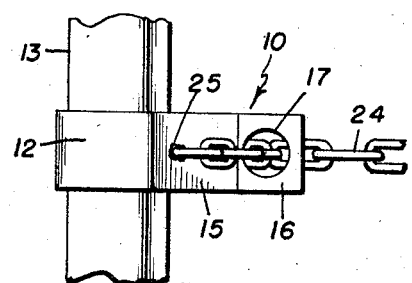

BUMPER CLAMP TOWING DEVICE

Walter W. Williams, Fort Dodge, Iowa

Application April 18, 1947, Serial No. 742,407

3 Claims. (Cl. 280—33.14)

This invention relates to new and useful improvements and structural refinements in towing devices, and the principal object of the invention is to provide a device of the character herein described, which may be conveniently and effectively employed as connecting means for towing one vehicle by another.

A further object of the invention is to provide a towing device which may be quickly and easily attached to or detached from the rear bumper bar of the drawing vehicle, but which will not accidentally become disconnected from said bumper bar when tension existing in the towing device is relaxed.

An additional object of the invention is to provide a towing device which is simple in construction, which will readily lend itself to economical manufacture, and which is otherwise well adapted for the purpose for which it is intended.

With the above more important objects in view and such other objects as may become apparent as this specification proceeds, the invention consists essentially of the construction and arrangement of parts as shown in the accompanying drawings in which:

Figure 1 is a top plan view of the invention;

Figure 2 is a side elevation thereof;

Figure 3 is an underside plan view of the same, and

Figure 4 is a cross-sectional view, taken substantially in the plane of the line 4—4 of Figure 2.

Like characters of reference are used to designate like parts in the specification and throughout the several views.

Referring now to the accompanying drawings in detail, the invention consists of a towing device designated generally by the reference character 10, the same embodying in its construction a pair of clamp members 11, 12 adapted to engage the upper and lower edge portions respectively of a vehicle bumper bar 13.

The lower clamp member 12 simply consists of a strap arcuated at one end thereof to provide a hook-shaped portion 14 which engages the lower edge portion of the bumper bar 13, while the remaining portion of the bar is upwardly angulated as at 15 and terminates in an out-turned guide bracket or lug 16. This lug is formed with an aperture 17, the purpose of which will be hereinafter more fully described.

The upper clamp member 11 consists of an upstanding plate 18 provided with a laterally extending strap 19, which, in turn, is arcuated to form a hook-shape portion 20 adapted to engage the upper edge portion of the bumper bar. It will be noted that the lower edge portion 21 of the plate 18 rests upon the bumper bar, as will be clearly apparent from Figure 2.

A pear-shaped link 22 is pivoted at the relatively large end thereof to an upstanding lug 23 which, in turn, is rigidly secured to the strap 19 of the clamp member 11.

A length of chain 24 is welded or otherwise secured as at 25 to the upwardly angulated portion 15 of the member 12, said chain extending through the aforementioned aperture 17 and passing freely through the large end portion of a key hole-shaped opening 26 which is defined by the aforementioned link 22.

When the invention is placed in use, the clamp members 11, 12 are simply applied to the upper and lower edge portions respectively of the bar 13, and after the relative spacing of the clamp member (depending upon the width of the bumper bar) is determined, one of the links of the chain 24 may be lockably engaged with the restricted portion 27 of the opening 26.

In this manner, the clamp members 11, 12 will be drawn together, as it were, by the end portion of the chain 24 extending between the strap portion 15 and the link 22, whereby the clamp members will be firmly and securely retained in position on the bar 13 as long as the chain remains in engagement with the portion 27 of the opening 26.

It should, of course, be understood that the free end portion 28 of the chain 24 is attached in a suitable manner to the drawn vehicle, and if, at any time, the distance between the drawing and drawn vehicles decreases so as to cause slackness in the connecting chain, the clamp members 11, 12 will not be accidentally or unintentionally detached from the bumper bar 13, as will be readily appreciated.

Needless to say, the purpose of the aperture 17 and the guiding bracket 16 is to maintain the associated end portion of the chain 24 in alignment with the restricted portion 27 of the opening 26.

It will be also observed that by virtue of the positional relationship existing between the lug 23 and the plate 18, the upper edge portion 29 of the latter will normally retain the link 22 in a substantially horizontal position, as is best shown in Figure 2.

It is believed that the advantages and use of the invention will be clearly apparent from the foregoing disclosure and accordingly, further description thereof at this point is deemed unnecessary.

While in the foregoing there has been shown and described the preferred embodiment of this invention it is to be understood that minor changes in the details of construction, combination and arrangement of parts may be resorted to without departing from the spirit and scope of the invention as claimed.

What I claim as my invention is:

1. In association with a vehicle bumper bar, a towing device comprising in combination, a pair of clamp members adapted to engage the upper and lower edge portions of said bar, a length of chain secured to one of said members, the remaining member being provided with a key hole-shaped opening, said chain passing freely through said opening and being lockably engageable with the restricted portion thereof.

2. In association with a vehicle bumper bar, a towing device comprising in combination, a pair of clamp members adapted to engage the upper and lower edge portions of said bar, a length of chain secured to one of said members, and a pear-shaped link movably attached to the remaining member, said link defining a key hole-shaped opening, said chain passing freely through said opening and being lockably engageable with the restricted portion thereof.

3. In association with a vehicle bumper bar, a towing device comprising in combination, a pair of clamp members adapted to engage the upper and lower edge portions of said bar, a length of chain secured to the lower of said members, a guide bracket also secured to said lower member and provided with an aperture, and a pear-shaped link pivoted at the relatively large end thereof to the upper member, said link defining a key hole-shaped opening, said chain passing freely through said aperture and through said opening, and being lockably engageable with the restricted portion of the latter.

WALTER W. WILLIAMS.